United States Patent
Pavlakos et al.

(10) Patent No.: US 11,078,783 B2
(45) Date of Patent: Aug. 3, 2021

(54) CALIPER-BEHIND-CASING FROM PULSED NEUTRON APPARATUS

(71) Applicant: Weatherford Technology Holdings, LLC, Houston, TX (US)

(72) Inventors: Paul Pavlakos, Calgary (CA); Gregory J. Schmid, Sugar Land, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/421,829

(22) Filed: May 24, 2019

(65) Prior Publication Data

US 2020/0370428 A1     Nov. 26, 2020

(51) Int. Cl.
| | | |
|---|---|---|
| E21B 49/00 | (2006.01) | |
| G01V 5/10 | (2006.01) | |
| E21B 47/06 | (2012.01) | |
| E21B 33/138 | (2006.01) | |
| E21B 47/002 | (2012.01) | |
| E21B 47/117 | (2012.01) | |

(52) U.S. Cl.
CPC .......... *E21B 49/00* (2013.01); *E21B 33/138* (2013.01); *E21B 47/002* (2020.05); *E21B 47/06* (2013.01); *E21B 47/117* (2020.05); *G01V 5/10* (2013.01)

(58) Field of Classification Search
CPC ......... G01V 5/10; E21B 47/002; E21B 47/06; E21B 47/117; E21B 49/00; E21B 33/138
See application file for complete search history.

(56) References Cited

U.S. PATENT DOCUMENTS

| | | | | |
|---|---|---|---|---|
| 2,609,052 | A | * | 9/1952 | Kantzer ............... E21B 33/138 166/287 |
| 4,035,639 | A | * | 7/1977 | Boutemy ............... G01V 5/107 250/264 |
| 4,791,797 | A | * | 12/1988 | Paske .................... E21B 47/085 73/152.03 |
| 4,964,085 | A | | 10/1990 | Coope et al. |
| 5,892,148 | A | * | 4/1999 | Durup ................. G01M 3/2892 73/152.52 |
| 6,285,026 | B1 | * | 9/2001 | Evans ................... E21B 47/085 250/269.4 |
| 7,999,220 | B2 | | 8/2011 | Odom |

(Continued)

OTHER PUBLICATIONS

Al-Nasser, M., et al., "Quantifying Gas Saturation with Pulsed Neutron Logging—An Inovative Approach," SPE 166025, SPE Reservoir Charachterization and Simulation Conference, Sep. 16-18, 2013, 10-pgs.

(Continued)

*Primary Examiner* — David Carroll
(74) *Attorney, Agent, or Firm* — Blank Rome LLP

(57) ABSTRACT

A caliper-behind casing apparatus and method determines a location and size of a washout (i.e., a void) behind casing in a borehole for a salt cavern used for storing hydrocarbons. The cavern and tubing in the casing are filled with brine. Gaseous nitrogen is used to fill an annulus between the tubing and the casing above and below a casing shoe to obtain image responses from operating a pulsed neutron logging tool in the tubing along the borehole. Analysis of burst ratios of near and far detectors on the pulsed neutron logging tool from these passes is used to detect and estimate a void or washout in the formation behind the casing.

21 Claims, 9 Drawing Sheets

(56) References Cited

U.S. PATENT DOCUMENTS

| | | |
|---|---|---|
| 9,012,836 B2 | 4/2015 | Wilson et al. |
| 9,383,473 B2 | 7/2016 | Guo |
| 2018/0058189 A1* | 3/2018 | Quintero ................. E21B 33/14 |

OTHER PUBLICATIONS

Berest, P, et al. "In Situ Mechanical Tests in Salt Caverns," Solution Mining Research Institute, Spring 2006 Technical Meeting, May 1-3, 2006, 39-pgs.

Trcka, D,, "Raptor: A New High-Technology, High-Value Pulsed Neutron Measurement from Weatherford," PowerPoint, copyright 2012, 27-pgs.

Weatherford, "Raptor 2.0 Cased-Hole Evaluation System," Brochure, copyright 2017, 8-pgs.

Berest, P, et al. "Transient behavior of salt caverns—Interpretation of mechanical integrity tests," International Journal of Rock Mechanics & Mining Sciences 44 (2007), dated Feb. 9, 2007, pp. 767-786.

Kansas Department of Health and Environment, "Nitrogen/Brine Interface Mechanical Integrity Test (MIT)," Procedure, dated Jun. 2011, 4-pgs.

* cited by examiner

CALIPER-BEHIND-CASING FROM PULSED NEUTRON APPARATUS

BACKGROUND OF THE DISCLOSURE

A. Summary of Borehole Logging

The logging of boreholes is well known in the oil, gas, mining, and water industries as well as in so-called "carbon capture" technologies, in which carbon dioxide is sequestered in underground formations. Broadly stated, the logging of a borehole involves inserting a typically elongate logging tool into a borehole to generate, record, and/or process data signals indicative of downhole conditions. (The terms "downhole" and "uphole" being familiar to the person of skill in the art).

In many, but not all cases, the logging tool includes a "sonde" that emits energy into the rock surrounding the borehole and also includes a number of receivers spaced along the borehole. The energy emitted by the sonde is intended to spread from the point(s) of emission so that the energy travels through the surrounding environment. Some of the energy following such passage through the environment encounters the receivers on the tool, and the returned energy stimulates the generation of (typically) electrical signals in the form of voltages and/or currents.

The passage of the energy through the environment alters the energy's character in ways that depend on the nature of the initially generated energy and depend on the components making up (or the physical properties of) the surrounding environment. Comparisons of the emitted and received energy permit interpretations to be made of the physical and other characteristics of the surrounding environment that cannot otherwise be determined from a surface location. The received energy signals and signals indicative of the results of such comparisons may be plotted, stored, transmitted, and processed as so-called "logs", which are graphical, numerical, data or other records of the energy signals that result from or can be derived from logging activity.

In a typical case, the logging tool is inserted from a surface location and gradually moved through the downhole environment. A large number of log data points, each representing log signals, are recorded as the logging tool is withdrawn towards the surface location.

There are various known ways of deploying logging tools to downhole locations. In many cases, the logging tool is connected to processing, memory, and command equipment by a wireline, i.e., armored cabling that is capable of telemetering data, commands and electrical power between the surface location and the logging tool. The nature and operation of wireline are well known.

In other cases, the logging tool operates autonomously and does not need to be connected to a surface location by a wireline. Instead, the logging tool carries an on-board source of power (e.g., a series of electrical batteries), a processing apparatus, and one or more memory devices so that the recording and at least some of the processing of log data signals can takes place while the logging tool is downhole.

The processing of the energy signals generated during logging that, as noted, usually are electrical signals, often occurs in accordance with mathematical models, algorithms, or expressions that are convenient ways of summarizing the processing steps in a manner familiar to those of skill in the art. In many cases, the processing of the energy signals resulting from logging activity gives rise to transformations of the energy signals to forms that differ from those originally generated in the logging process.

One parameter of a borehole penetrating a formation that is frequently measured is the internal diameter or "caliper" of the borehole. Caliper is often measured in an openhole, which is a borehole (or a length of borehole) that is not cased or lined. In the openhole, a caliper logging tool including measuring arms can contact the wall of the borehole. Such an openhole caliper measurement is of use in identifying sections of a borehole that have caved in or have swollen after drilling of the borehole has taken place. The caliper measurement is regarded as an environmental parameter that ideally is invariant. Its value is logged primarily so that the effects of caliper variations, when they occur, on other log signals can be taken account of.

In many implementations, a borehole is lined with casing to stabilize the borehole's structure, to permit the ready flow of desired chemicals into and out of the borehole (or to allow the insertion of production tubing that has this aim), and to provide known locations at which equipment can be secured and process steps carried out.

Accordingly, in a great many boreholes in the oil and gas industries, lining the borehole involves inserting casing, i.e., joined lengths of rigid steel tube of slightly smaller nominal outer diameter than the borehole, into the borehole. Cement is injected in the annular space between the casing and the wall of the borehole, and the cement sets to secure the casing against subsequent movement. Following such steps, the other stages of well completion that are well known to the person of skill in the art may take place.

B. Summary of Storage in Salt Caverns

Such cased boreholes are used in underground storage sites that store hydrocarbons and also carbon dioxide from carbon capture technologies. These storage sites include depleted reserves in oil and gas field, aquifers, and salt caverns. Of these, a salt cavern can be used to store of all forms of hydrocarbon products, such as crude oil, natural gas, etc. due to its physical characteristics, such as porosity, permeability, retention capability, and the like. The hydrocarbons do not dissolve the salt, which would compromise the cavern.

A salt cavern may be created deep in a salt formation using solution mining in which fresh water is injected into a borehole drilled into the salt formation. The salt is dissolved, and the brine is pumped out. The resulting cavern may typically be cylindrical in shape. The ceiling of the cavern can be hundreds of meters below the top of the salt formation, and the height of the cavern can be up to ten times its width in some cases. The borehole to the cavern is cased, typically with a larger casing diameter than used in oil and gas exploration and production wells.

To store natural gas in the cavern, the gas is pressurized by compressors and is injected into the cavern. The built-up pressure can then be used to deliver the gas from the cavern when needed. However, a minimum amount of pad gas is left within the cavern to maintain its integrity.

To store liquid hydrocarbons, brine is used as a displacement fluid because the brine is heavier than the hydrocarbons and settles below the hydrocarbons. To remove the hydrocarbons from the cavern, operators pump the brine down a tubing string that extends through the borehole's casing and into the cavern near the bottom. The brine displaces the hydrocarbons, which can then be drawn through the annulus between the tubing string and the casing toward the top of the cavern. To inject the hydrocarbons into the cavern, a reverse process is used with the brine being removed from the bottom of the cavern and with the hydrocarbon being injected through the annulus between the tubing string and the casing.

C. Summary of Mechanical Integrity Tests

On a regular basis, Mechanical Integrity Tests (MIT) are performed to test whether the salt cavern and the casing are robust and not leaking. The tests are conducted when the salt cavern is initially put online. Then, additional tests are typically performed every few years depending on requirements.

The typical configuration for the salt cavern has at least one tubing string that is filled with brine and that extends through the cemented casing in the salt formation. The MIT procedure to test the casing involves injecting gaseous nitrogen ($N_2$) in the annulus between the tubing string and the casing to a point above the cemented casing shoe. A logging tool is commonly used to determine and place the nitrogen interface depth for the test. The pressure from the injected nitrogen is held for a predetermined amount of time, which can be governed by a given formula for a minimum detectable leak rate.

Occasionally, the casing does not pass the integrity test. For example, a typical problem may be caused by a washout that has occurred behind the casing and particularly in the salt intervals of the formation. When a leak is present, the interface of the brine and nitrogen may move uphole to the location of the leak, and there may be a loss in nitrogen pressure. The detected leak rate may be unacceptable when it exceeds a defined value of barrels of nitrogen loss per year. To mitigate any leaks, a common remedy is to pump a resin into the washout that hardens and creates a seal.

The MIT procedure to test the salt cavern is similar to that used to test the casing and involves injecting gaseous nitrogen ($N_2$) in the annulus between the tubing string and the casing to a point below the cemented casing shoe. Again, the logging tool is commonly used to determine and place the nitrogen interface depth for the test. Monitoring of the interface, pressures at the wellhead, nitrogen volume, and the like are performed to determine whether a minimum detectable leak rate for the salt cavern falls below a defined value of barrels of nitrogen loss per year.

What is needed is a way to determine whether a washout exists in an installation of a salt cavern. Even if no problem appears to exist with the installation, operators are interested in knowing if a washout has occurred and to what extent. What is also needed is a way to estimate the amount of resin that may be required should a washout exist and need to be sealed.

The subject matter of the present disclosure is directed to overcoming, or at least reducing the effects of, one or more of the problems set forth above.

SUMMARY OF THE DISCLOSURE

A method of logging a borehole in a formation is disclosed. The borehole has casing installed therein to a casing shoe, and the borehole has tubing that is installed in the casing and extends beyond the casing shoe. The borehole can be for a salt cavern used for storage of hydrocarbons or the like, and the logging can be performed to determine the integrity of the borehole.

In the method, the tubing and an annulus between the tubing and the casing are filled with a liquid. A gas is injected into the annulus between the tubing and the casing to a first point above the casing shoe of the casing in the borehole. A first image response is obtained of a portion of the borehole with the annulus filled with the injected gas above the casing shoe by operating a logging tool in the tubing along the borehole.

The gas is injected into the annulus between the tubing and the casing to a second point below the casing shoe of the casing in the borehole. A second image response is obtained of the portion of the borehole with the annulus filled with the injected gas below the casing shoe by operating the logging tool in the tubing along the borehole.

The second image response is compared to the first image response. A void is detected in the formation behind the casing based on the comparison.

Filling with the liquid can comprise filing with brine as the liquid, and injecting the gas can comprise injecting gaseous nitrogen as the gas.

Before the first image response is obtained, the method can comprise obtaining an initial image response of the portion of the borehole with the tubing and the annulus filled with the liquid by operating the logging tool in the tubing along the borehole. The first image response can be calibrated based on the initial image response.

The method can further comprise estimating a volume of the detected void in the formation. An amount of resin can be estimated to fill the estimated volume of the detected void. With that, the estimated amount of resin can be pumped to fill the detected void.

Obtaining the second image response of the portion of the borehole with the annulus filled with the injected gas below the casing shoe by operating the logging tool in the tubing along the borehole can comprise: making a first pass of the portion of the borehole with the logging tool; making at least one second pass of the portion of the borehole with the logging tool after a period of time; and comparing the second image response of the first pass to that of the at least one second pass.

From this comparison, a determination can be made that an interface between the liquid and the injected gas has not shifted. In this way, the second image response can be verified from the comparison.

Obtaining the first and second image responses by operating the logging tool in the tubing along the borehole can comprise operating a pulse neutron logging tool as the logging tool. For example, operating the pulse neutron logging tool can comprise: counting first bursts as a function of depth at a first detector of the pulsed neutron logging tool a first distance the neutron source; counting second bursts as a function of depth at a second detector of the puled neutron logging tool second distance from the neutron source, the second distance greater than the first distance; and calculating a burst ratio of the first burst count relative to the second burst count as a function of depth.

In this arrangement, comparing the second image response to the first image response can comprise subtracting the calculated burst ratio of the first image response as a function of depth from the calculated burst ratio of the second image response as a function of depth; and extrapolating caliper of the borehole as a function of depth from the difference based at least on a porosity of the formation in which the borehole is disposed.

When injecting the gas into the annulus between the tubing and the casing to the first point above the casing shoe of the casing in the borehole, pressure of the injected gas can be monitored for a predetermined amount of time; and calculating a leak rate of the injected gas as a function of the monitored pressure relative to the predetermined amount of time.

When injecting the gas into the annulus between the tubing and the casing to the second point below the casing shoe of the casing in the borehole, pressure of the injected gas can be maintained for a predetermined amount of time;

and calculating a leak rate of the injected gas as a function of the monitored pressure relative to the predetermined amount of time.

The detection of the void in the formation behind the casing based on the comparison can be based on a porosity of the formation.

A method of testing integrity of a salt cavern in a salt formation is disclosed. The salt cavern has a borehole lined with casing to a casing shoe. The borehole has tubing that is installed in the casing and that extends beyond the casing shoe into the salt cavern.

The tubing and an annulus between the tubing and the casing are filled with brine, and a gas is injected into the annulus between the tubing and the casing to a first point above the casing shoe of the casing in the borehole. A first image response is obtained of a portion of the borehole with the annulus filled with the injected gas above the shoe by operating a logging tool in the tubing along the borehole;

The gas is injected into the annulus between the tubing and the casing to a second point below the casing shoe of the casing in the borehole. Pressure of the injected gas is monitored for a predetermined time interval and calculating a leak rate of the injected gas as a function of the monitored pressure relative to the predetermined time interval. A washout is predicted in the formation behind the casing based on the calculated leak rate.

A second image response is obtained of the portion of the borehole with the annulus filled with the injected gas below the shoe by operating the logging tool in the tubing along the borehole. A volume of the washout is then estimated in the formation behind the casing by comparing the second image response to the first image response.

Additional steps for this method can comprise those discussed with respect to the method described prior.

A method of logging a borehole in a formation is disclosed. Again, the borehole has casing installed therein to a casing shoe. The borehole has tubing that is installed in the casing and that extends beyond the casing shoe. The borehole can be for a salt cavern used for storage of hydrocarbons or the like, and the logging can be performed to determine the integrity of the borehole.

In the method, the tubing and an annulus between the tubing and the casing are filled with a liquid, and a first image response is obtained of a portion of the borehole with the annulus filled with the liquid by operating a logging tool in the tubing along the borehole.

A gas is injected into the annulus between the tubing and the casing to a point below the casing shoe of the casing in the borehole, thereby allowing the gas to enter a potential void in the borehole behind the casing. Any of the injected gas is removed from the annulus while the gas is allowed to remain in the potential void.

A second image response is obtained of the portion of the borehole while the annulus is filled with the fluid and the potential void is filled with the gas by operating the logging tool in the tubing along the borehole. The second image response is compared to the first image response. The potential void is then detected in the formation behind the casing based on the comparison.

In one arrangement for this method, the removal of the gas in the annulus can comprise extracting the injected gas from the annulus by displacing the gas in the annulus with the liquid supplied through the tubing. In another arrangement of the method, the gas is injected directly at an open hole portion of the borehole at a point below the casing shoe of the casing in the borehole.

Either way, the second image response can be obtained of the portion of the borehole with the annulus filled with the displacement fluid by operating the logging tool in the tubing along the borehole. The second image response can be compared to the first image response to detect the void in the formation behind the casing based on the comparison due to the injected gas potentially trapped in the void.

A system of logging a borehole in a formation is disclosed. The borehole has casing installed therein to a casing shoe. The borehole has tubing that is installed in the casing extending beyond the casing shoe. The system comprises injection equipment, a logging tool, and processing equipment.

The injection equipment is in fluid communication with an annulus between the casing and the tubing. The injection equipment is operable to inject gas in a first stage into the annulus between the tubing and the casing to a first point above the casing shoe of the casing in the borehole and is operable to inject gas in a second stage into the annulus between the tubing and the casing to a second point below the casing shoe of the casing in the borehole.

The logging tool is configured to deploy in the tubing. The logging tool is operable to obtain a first image response of a portion of the borehole in the first stage and is operable to obtain a second image response of the portion of the borehole in the second stage.

The processing equipment is in operable communication with the logging tool. The processing equipment is configured to: compare the second image response to the first image response; and detect a void in the formation behind the casing based on the comparison.

The logging tool can comprise: a neutron source being configured to emit neutrons in bursts followed by wait times; a first gamma ray detector spaced at a first distance on the logging tool from the neutron source; and a second gamma ray detected spaced at a second distance on the logging tool from the neutron source greater than the first distance, each of the first and second gamma ray detectors configured to detect gamma rays induced from the emitted neutrons respectively during the bursts and wait times as a function of depth.

The foregoing summary is not intended to summarize each potential embodiment or every aspect of the present disclosure.

DETAILED DESCRIPTION OF THE DISCLOSURE

A caliper-behind casing apparatus and method disclosed herein determines a location and size of a washout (i.e., a void) behind casing in a borehole. The apparatus and method can be generally applied to any cased hole environment. A particular application of the disclosed subject matter is in salt caverns used for storing hydrocarbons.

A. Well Arrangement for Salt Cavern Storage

Figure 1:
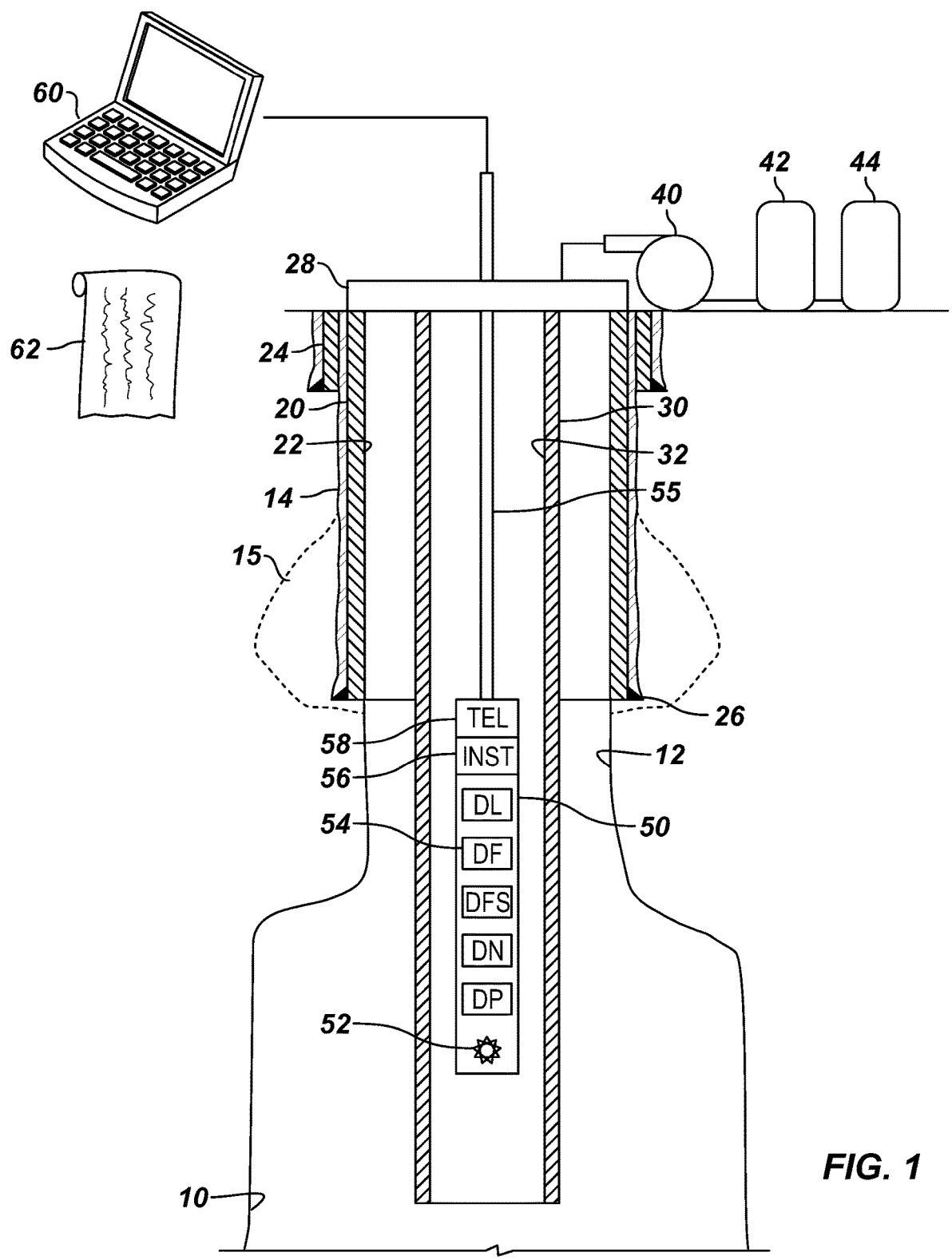
FIG. 1 illustrates a system for detecting a void or a washout in a cased borehole extending from surface to a subterranean salt cavern.

FIG. 1 illustrates a system for detecting a void or a washout in a cased borehole 12 extending from surface to a subterranean formation 10. As shown in schematic form in FIG. 1, the cased borehole 12 penetrates the formation, which here includes a salt formation. The borehole 12 typically would be formed through a drilling operation and may be several hundred or thousand meters in length. The borehole 12 extends from the surface to the salt cavern 10, which has been created to store hydrocarbons. A typical nominal diameter (caliper) of the borehole 12 may be 12-in, although other diameters can be used. The borehole 12 is nominally circular in cross-section, but this is unlikely to be consistent from place to place along the borehole 12.

In the configuration for the salt cavern 10, the borehole 12 extending from surface to the cavern 10 has a casing 20 cemented to a depth therein. A tubing string 30 extends from a wellhead 28 at surface and is disposed in the salt cavern 10. As noted, the salt cavern 10 may be created deep in the salt formation using solution mining in which fresh water is injected into the borehole 12 drilled into the salt formation. The cavern 10 can be used to store natural gas, in which case gas can be pressurized by compressors 40 and injected into the cavern 10. The built-up pressure can then be used to deliver the gas from the cavern 10 when needed.

The cavern 10 can also be used to store liquid hydrocarbons by using a liquid (namely, brine) as a displacement fluid. To remove the hydrocarbons from the cavern 10, the brine is pumped down the tubing string 30, which extends into the cavern 10 near the bottom. In the cavern 10, the brine displaces the hydrocarbons, which can then be drawn through the annulus 22 between the casing 20 and the tubing 30 toward the top of the cavern 10. To inject the hydrocarbons into the cavern 10, a reverse process is used with the brine being removed from the bottom of the cavern 10 and with the hydrocarbon injected through the annulus 22 between the casing 20 and the tubing A conductor pipe 24 is typically used toward the surface, and the casing 20 extends down the borehole 12 and ends with a casing shoe 26 toward the top of the salt cavern 10. The conductor pipe 24 may be 16-in. The bit sized used to drill the borehole 12 may have been 14-3/4-in, and the casing 20 cemented in the borehole 12 can be 11-3/4-in. Under normal circumstances, the casing 20 would be of essentially consistent cross-section along its length, and in a typical situation, the casing 20 is made of steel or another rigid metal alloy. In some implementations, an inner liner (not shown) may be cemented inside the casing 20 at least partially along the depth of the casing 20. For example, the cased liner (not shown) may extend just short by about 20-ft (6-m) or so above the casing shoe 26 on the end of the cemented casing 20.

For its part, the tubing 30 extends through the casing 20 and any internal cased liner 24 and extends well into the cavern 10, typically further than depicted here in FIG. 1. As an example, the tubing 30 may have a diameter of 8-5/8-in and may typically be decentralized in the casing 20, contrary to the way it is depicted here in FIG. 1.

As is typical, the casing 20, the liner 24, and the uppermost part of the borehole 12 near the wellhead 28 are sealed with cement. This can be achieved using a series of nested casing sections cemented in the formation near the wellhead 28 at the surface.

When working normally, the borehole 12 would appear approximately as depicted in FIG. 1. However, as described herein various, washouts and leaks can occur. This is represented in FIG. 1 by an enlarged caliper borehole section or void 15, delineated by dotted lines, which can result from a washout of the formation outside the casing 20.

1. Logging Arrangement with Logging Tool

Logging the caliper of the borehole 12 in such situations is desirable (i) to ensure the integrity of the salt cavern 10, the borehole 12, and the casing 20; and (ii) to establish the volume of any void 15 lying outside the casing 20 so that a determination can be made of the cost for remediating the borehole 12. Unfortunately, any conventional techniques for logging to determine the caliper of the borehole 12 behind the casing 20 are complicated in the present arrangement due to the presence of the additional elements of the tubing 30, the brine in the tubing 30, the gas in the annulus 22 between the casing 20 and the tubing 30, the casing 20 itself, and any cement fixing the casing 20 in the borehole 12.

To log the caliper of the borehole 12 according to the present system, FIG. 1 shows a logging tool 50 suspended on a conveyance 55, such as wireline, inside the tubing 30 extending through the casing 20 (and liner 24 if present). As is well known, the wireline 55 permits the transmission at least of electrical power and commands for the logging tool 50 from surface equipment 60 to the logging tool 50 and permits the transmission of electrical signals representing log data from the logging tool 50 to the surface equipment 60.

In a typical deployment of the logging tool 50, the wireline 55 is paid out from a surface drum (not shown) as the logging tool 50 is conveyed—e.g., under gravity or by being pumped as is known in the art, to a depth at which logging is to commence. The logging tool 50 is then withdrawn back towards the surface by winding the wireline 55 back on to its dispensing drum. During this uphole movement, the logging tool 50 records information about the borehole 12.

2. Type of Logging Tool

Various types of logging tools 50 could be used. For example, the logging tool 50 can be a pulse neutron logging tool having a neutron source 52 and a number of gamma ray detectors 54. Alternatively, the logging tool 50 can be a density logging tool having a source 52 of gamma radiation and a number of gamma ray detectors 54. Although shown embodied in a wireline logging tool, the source 52 and detectors 54 can also be embodied in other borehole instruments. These instruments include pump-down ("memory") instruments conveyed by fluid flow, instruments conveyed by coiled tubing, instruments conveyed by a drill string, and instruments conveyed by a "slick line."

As shown in FIG. 1, for example, the logging tool 50 can be a multipurpose pulsed neutron logging tool 50, including a pulsed neutron generator or source 52, an array of detectors 54, an instrument assembly 56, and a telemetry assembly 58. In the arrangement shown, four of the detectors 54 are referenced as a proximal detector (DP), a near detector (DN), a far detector (DF), and a long detector (DL). These four detectors 54 can include spectroscopic Lanthanum Bromide ($LaBr_3$) detectors having a $LaBr_3$ detector crystal and a digital spectrometer for filtering and pulse inspection. These four detectors 54 are disposed at increasing axial spacings from the neutron source 52, as their names imply. An additional detector 54 can be a fast neutron detector (DFS) disposed between the near detector (DN) and the far detector (DF).

The instrument assembly 56 houses control circuits and power circuits to operate and control the elements of the tool 50. The telemetry assembly 58 is operationally connected to the instrument assembly 56. A suitable connector connects the logging tool 50 to a lower end of a preferably multiconductor logging cable 55, and the upper end of the logging cable 55 terminates at a draw works (not shown).

Detector response data is telemetered from the tool 50 to surface where the data is received by an uphole telemetry unit (not shown) preferably disposed within the surface equipment 60. The data is processed in a surface processor (not shown) within the surface equipment 60 to yield logs 62 of one or more parameters of interest. Alternately, data can be partially or completely processed in a downhole processor within the instrument assembly 56 and telemetered via the telemetry assembly 58 to the surface equipment 60. Control parameters can also be telemetered from the surface equipment 60 to the tool 50 via the telemetry system and wireline cable 55.

3. Mechanical Integrity Test of Well Arrangement

On a regular basis, a Mechanical Integrity Test (MIT) is performed to test whether the salt cavern 10 and the casing 20 (and the liner 24) are robust and not leaking. For the test, the tubing string 30, the cemented casing string 20, and the salt cavern 10 are filled with a liquid (most preferably brine). At surface, pumping or compressing equipment 40 is operable to inject gas, such as gaseous nitrogen ($N_2$), from a source 42, through the wellhead 28, and into the annulus 22 between the casing 20 and the tubing string 30. Instead of nitrogen, the MIT can be performed using a liquid, such as oil, condensate, diesel, etc. However, gaseous nitrogen ($N_2$) may be preferred according to the MCNP model of the present disclosure because the tool sensitivity to the gaseous nitrogen versus water is good. Overall, any fluid (gas or liquid) can be used according to the present techniques as long as there is a sufficient difference in density between the two fluids.

For the test, the logging tool 50 is deployed into the tubing string 30. Rather than just determining the interface between the brine and the nitrogen downhole for the purposes of performing the Mechanical Integrity Test, the neutron logging tool 50 of the present disclosure is operated to make specific caliper measurements as discussed in more detail below. In turn, the surface processor 60 obtains readings from the logging tool 50 through storage, telemetry, or the like and produces output in the form of logs 62 or the like to detect and estimate the volume of any void or washout 15 behind the casing 20.

In general, the logging tool 50 is operated in the tubing 30, and the source 52 produces bursts of high-energy neutrons. After emission from the source 52 and passage through the surrounding environment between the source 52 and the detectors 54, the detected radiation at the detectors 54 implies information about the surrounding environment from which the caliper can be determined behind the casing 20.

As is well known, the detectors 54 produces electrical signals that can be transmitted and/or processed as required. In the wireline-based embodiment of FIG. 1, the output signals of the detectors 54 can be transmitted via the wireline 55 to the surface equipment 60 represented schematically in the figure as a desktop computer. Other forms of processing device can be used within the scope of the present disclosure, including processors located far from the surface location and processors that are carried on-board on the logging tool 50.

In more detail, the source 52 emits neutrons in a plurality of bursts into the surrounding environment at an energy level sufficient to induce inelastic scatting gamma rays. Each burst occurs for a defined duration and is followed by a wait time having another defined duration. The neutrons scatter and are eventually captured by atomic nuclei in the environment at a rate proportional to the population of the neutrons. When capture occurs, gamma rays are produced, some of which can be detected by the detectors 54. Chlorine is a strong neutron absorber so the response of the logging tool 50 may be based primarily by the chlorine present (as sodium chloride) in the surrounding environment.

During operation, the detectors 54 count the resulting gamma rays produced by interactions of the emitted neutrons with the surrounding environment, such as the formation, brine, etc. The number of gamma rays detected decays as the population of the neutrons eventually decays and the neutrons are absorbed by the surrounding environment. In this way, the surface equipment 60 and/or the logging tool 50 can determine the rate of decay of thermal neutrons in the environment based on the measured decay in the gamma rays produced as these neutrons are absorbed.

The gamma rays are detected at the spaced nearest and farthest (e.g., DP, DL) detectors 54 during each of the bursts and during each of the wait times. Therefore, a "burst ratio" of the counts of gamma rays detected by the nearest (e.g., DP) detector 54 relative to the counts of gamma rays detected by the farthest (e.g., DL) detector 54 during the bursts is determined. Likewise, a "capture ratio" of the counts of gamma rays detected by the nearest (e.g., DP) detector 54 relative to the counts of gamma rays detected by the farthest (e.g., DL) detector 54 during the wait times can be determined.

Using the detector responses, for example, the surface equipment 60 can obtain a nearest-to-farthest burst ratio during the neutron burst and can obtain a nearest-to-farthest capture ratio during the wait times. Both of these values are derived from the count rates of the nearest and farthest detectors (e.g., DP and DL) 54. In this way and as noted previously, the ratio of the nearest and farthest count rates during the neutron burst refers to the burst ratio, whereas the ratio of the nearest and farthest count rates during a time interval after the burst refers to the capture ratio. The burst ratio contains inelastic gamma ray events induced by the fast neutrons.

As discussed in more detail below, the processing equipment 60 uses these detector responses to detect the presence of any washouts or voids 15 behind the casing 20. Additionally, the processing equipment 60 can estimate the volume of the washout 15 so that a resin can be pumped to fill the washout 15. Use of a resin is the most common approach and may be the most effective solution. However, other options can be used to such as squeezing cement or using some other type of sealant.

Because the logging tool 50 must be deployed in the tubing 30 that extends in the casing 20 (and the cemented liner 24 if present), conventional techniques of determining the caliper behind the casing 20 cannot be used. Instead, the processing equipment 60 of the present disclosure uses a modelling and analysis technique and a logging process that detects voids or washouts in an arrangement as shown here in which tubing 30 that extends in the casing 20 cemented in the borehole 12 of the formation.

Given an understanding of the well arrangement and components of the system for logging the well arrangement, discussion turns to details for the modelling and analysis technique to detect voids or washouts.

B. Modelling Washout Behind Casing

Figure 2A:
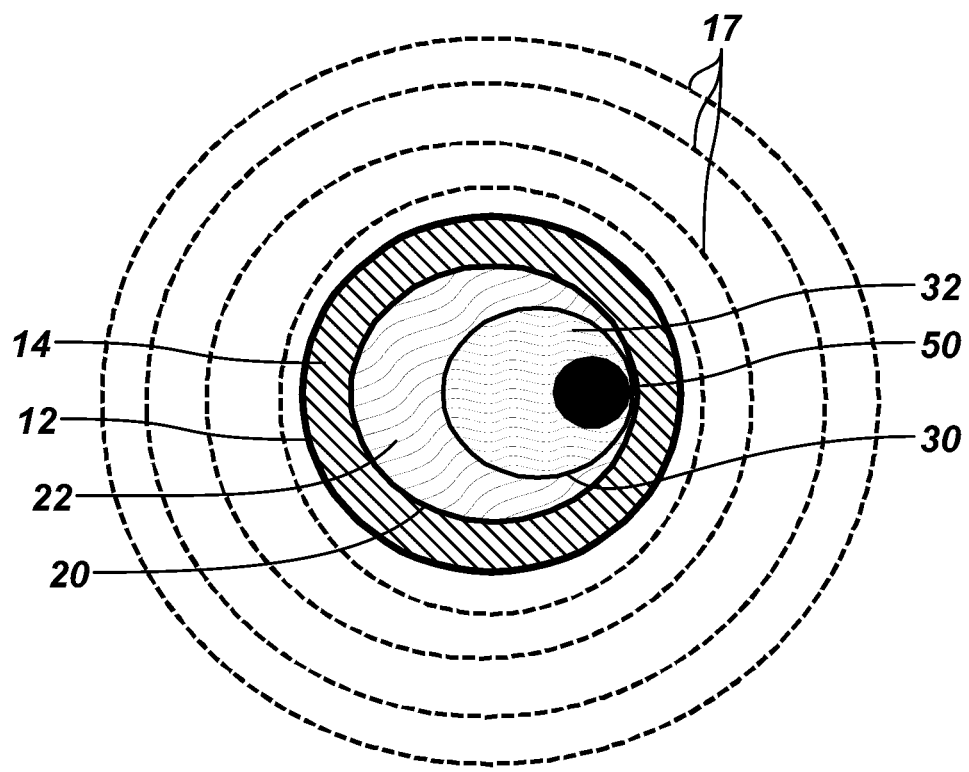
FIGS. 2A-2B illustrate schematic cross-sections of a logging tool disposed in tubing and casing of a borehole for modeling a void or a washout in a surrounding formation.
Figure 2B:
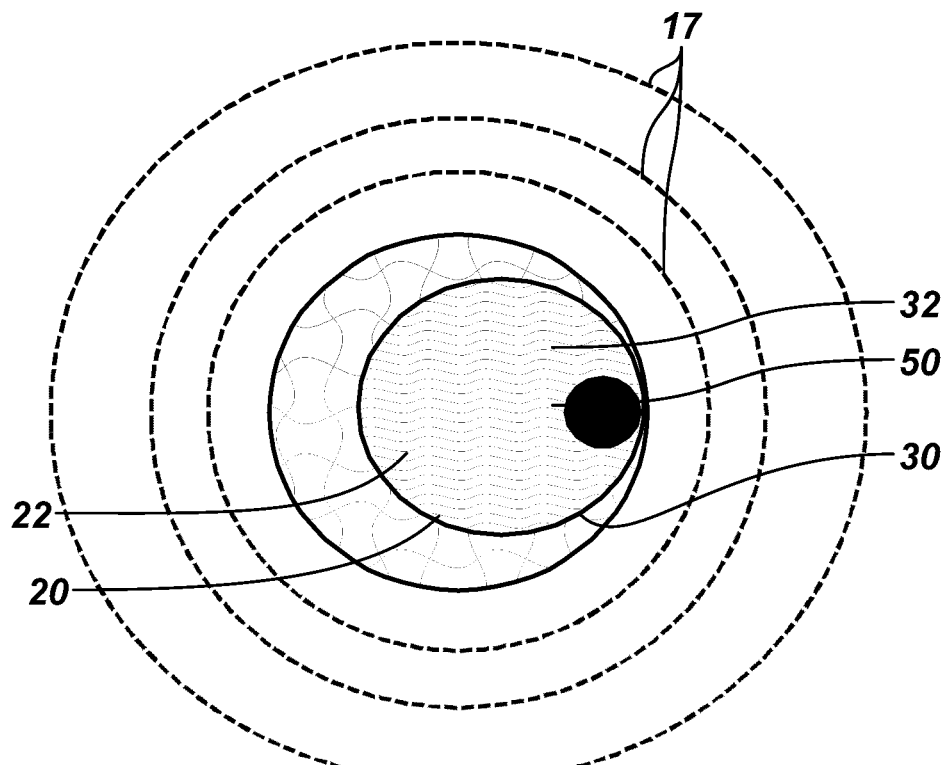

FIGS. 2A-2B illustrates in schematic cross-sections the logging tool 50 disposed in the tubing 30, which in turn is disposed in the cemented liner 24 and the casing 20 of a borehole. In FIGS. 2A-2B, the tubing string 30 is shown decentralized from the cemented liner 24 and the casing 20, and the logging tool 50 is shown deployed in the tubing 30, which is filled with brine. The annulus 22 between the tubing 30 and the liner 24/casing 20 is filled in the modelling alternatively with brine and then gas. Various hole sizes 17 indicative of possible void or washout diameters are depicted outside the cemented casing 20.

As an example, the tubing 30 may have 8-⅝-in diameter, and the casing 20 may have a 11-¾-in diameter. The various hole sizes 17 for modeling may have diameters of about 12, 15, 18, 21, 24, 27-in, etc. representative of increasing amounts of standoff from a potential void or washout behind the casing 20 that could be filled with gas (i.e., the gaseous nitrogen) during analysis.

As noted above, the arrangement may not pass mechanical integrity testing due to leaking, and operators may suspect a washout behind the casing 20. The remedy would be to pump a resin behind the casing 20 to seal off the leak. Preferably, operators can obtain an estimate of the washout to determine the volume of resin required.

Figure 3:
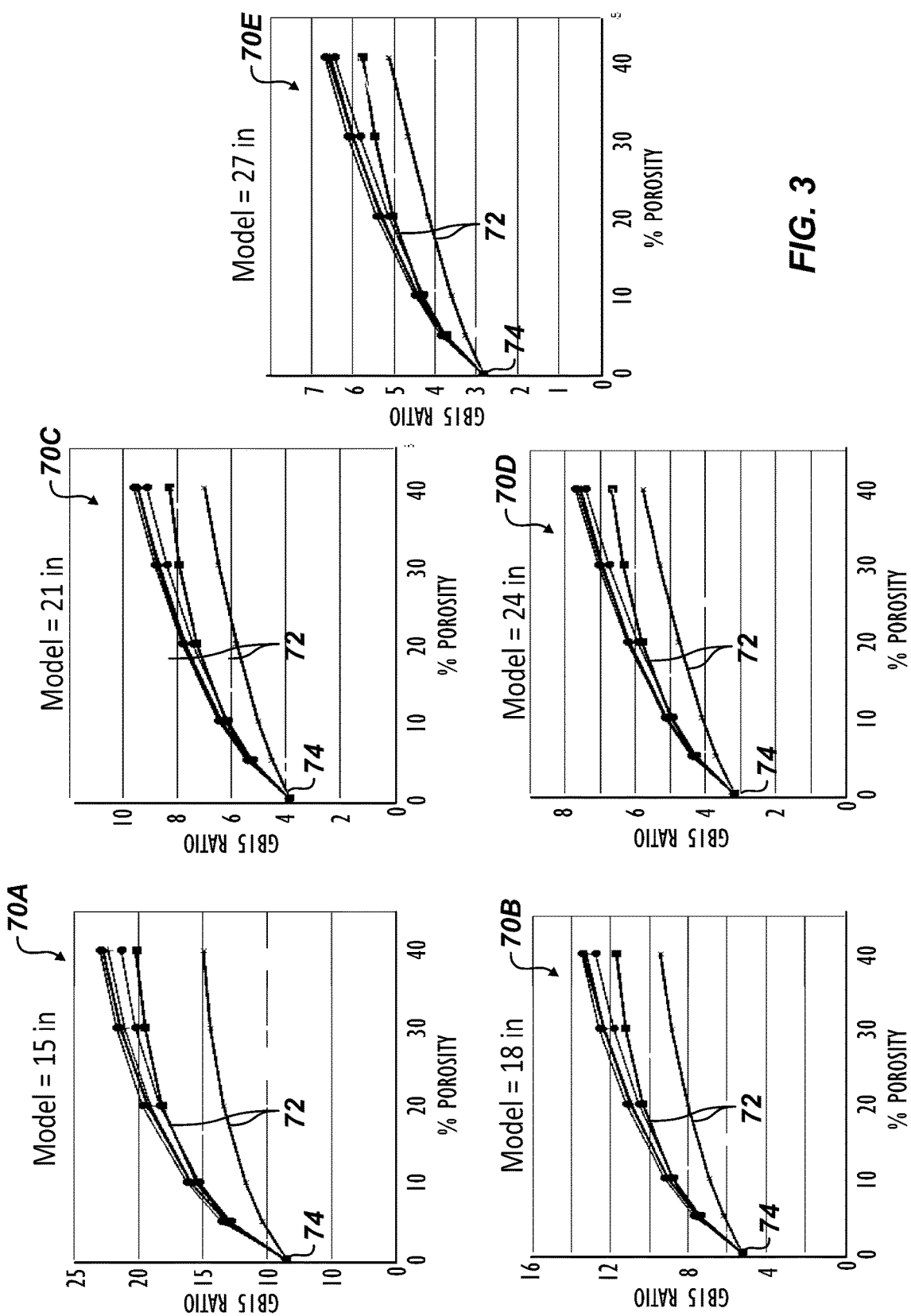
FIG. 3 illustrates several graphs where MCNP radiation transport simulations are used to model the GB15 burst ratio (burst counts in the nearest detector, DP, ratioed to the farthest detector, DL) as a function of porosity for different fluid types.

To build the model to detect the potential washout and estimate its volume, porosity (percentage) is graphed relative to a burst ratio (based on proximal to farthest detectors) for different modelled possible washout diameters 12, 15, 18, 21, 24, 27-in. etc. in the formation surrounding the casing 30. For example, FIG. 3 illustrates several graphs 70A-70E modelling burst ratio measurements that are predicted by operating the pulsed neutron logging tool (50) in a borehole in a surrounding formation. The borehole in each graph 70A-70E has a modelled diameter (e.g., 15, 18, 21, 24, 27-in., etc.). The formation in each graph 70A-70E is also filled with different fluid types, such as fresh water, salt water, different type of gases, and different types of hydrocarbons, as depicted by the different curve lines 72. For example, graph 70A shows curves lines 72 of the various fluid types correlating a predicted burst ratio of the nearest detector, DP, to the farthest detector, DL, which is called the GB15 Ratio, relative to porosity of a surrounding formation having a 15-in. diameter borehole. In this graph, the annular region between casing and borehole diameter is filled with nitrogen gas (N2), Of interest in this graph is the level of porosity 74 at zero depicted in the graphs 70A-70E, because zero porosity would be indicative of the porosity of a salt formation in the implementation of FIG. 1. As shown in graph 70A, for example, the value 74 at zero porosity of the salt formation with a 15-in diameter borehole is predicted to produce a burst ratio (GB15 Ratio) from the pulse neutron investigation of "8.51." As shown in the other graphs 70B-7E, the values 74 at zero porosity of the salt formation with increasing diameter boreholes of 18, 21, 24, 27-in would produce decreasing burst ratios from the pulse neutron investigation. This is shown in Table I in the column labeled "GB15 Ratio with N2 filled washout". If the annular region is instead filled with saltwater (SW), the GB15 ratios trend in the opposite direction. This is shown in Table I in the column labeled "GB15 Ratio with SW filled Washout." The final column of Table I is the ratio of the previous two columns, and shows a strong correlation to the radial extent of the washout. This is shown graphically in FIG. 4.

TABLE I: GB15 Ratios vs Modelled Diameter

| Modelled GB15 Diameter Washout | Modelled Radial Extent of Washout | GB15 with SW Filled Washout | GB15 with N2 Filled Washout | GB15 SW/N2 |
|---|---|---|---|---|
| 12-in. | 0.25-in. | 0.125-in. | 19.03 | 16.35 | 1.16 |
| 15-in. | 3.25-in. | 1.625-in. | 30.28 | 8.51 | 3.56 |
| 18-in. | 6.25-in. | 3.125-in. | 33.37 | 5.21 | 6.41 |
| 21-in. | 9.25-in. | 4.625-in. | 34.35 | 3.85 | 8.92 |
| 24-in. | 12.25-in. | 6.125-in. | 34.67 | 3.18 | 10.90 |
| 27-in. | 15.25-in. | 7.625-in. | 34.68 | 2.83 | 12.25 |
| 30-in. | 18.25-in | 9.125-in. | 34.68 | 2.63 | 13.19 |
| 33-in. | 21.25-in | 10.625-in. | 34.68 | 2.52 | 13.76 |

Figure 4:
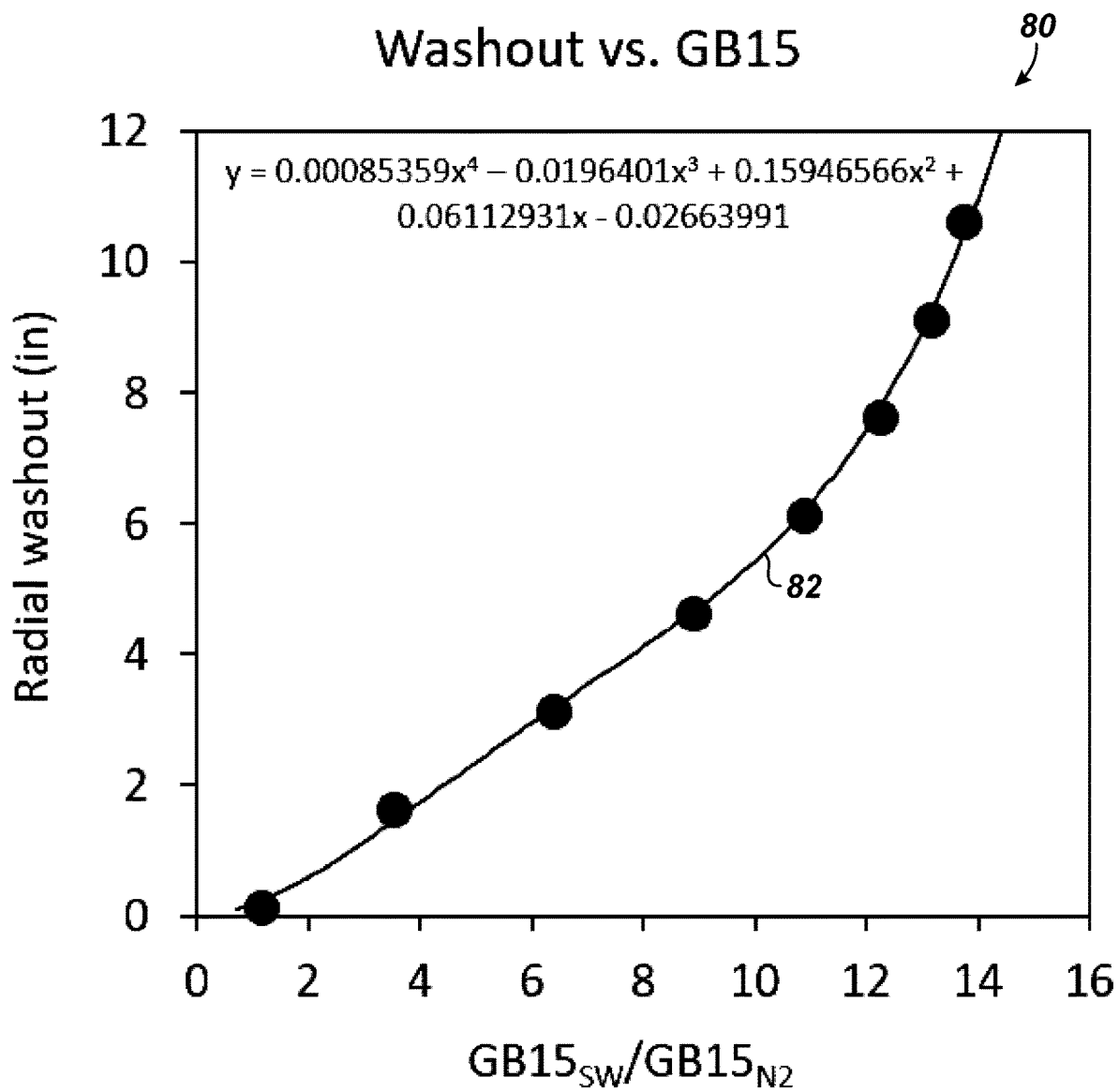
FIG. 4 illustrates a graph showing the numerical correlation between radii of washout behind casing verses the simulated ratio of two GB15 measurements (SW in annular region vs $N_2$ gas in annular region).

FIG. 4 provides an example of the mathematical correlation between the radial extent of the washout (y) vs the ratio of GB15 for the SW and N2 gas filled cases ($GB15_{SW}/GB15_{N2}$) (x). The equation is: $y=0.00085359x^4-0.0196401x^3+0.15946566x^2+0.06112931x-0.02663991$.

As discussed above with reference to FIGS. 3 and 4, the borehole 12 for the salt cavern 10 extends through a salt formation so that analysis has focused on the data and modeling related to detecting a washout 15 in the salt formation surrounding the casing 20. Thus, the data and modeling has focused on the surrounding salt formation as having about zero percent porosity. As will be appreciated, the borehole 12 may be disposed in other types of materials, such as sandstone, limestone, dolomite, etc., and the analysis and modeling can be tailored to detecting a washout 15 in the formation of these other materials given their porosity, as generally indicated in the graphs of FIG. 3. This would produce comparable graphed correlations of the normalized burst ratio relative to predicted washout as in FIG. 4, but tailored to a formation of other expected or know porosity.

C. Process of Detecting/Estimating Washout Behind Casing

Figure 5:
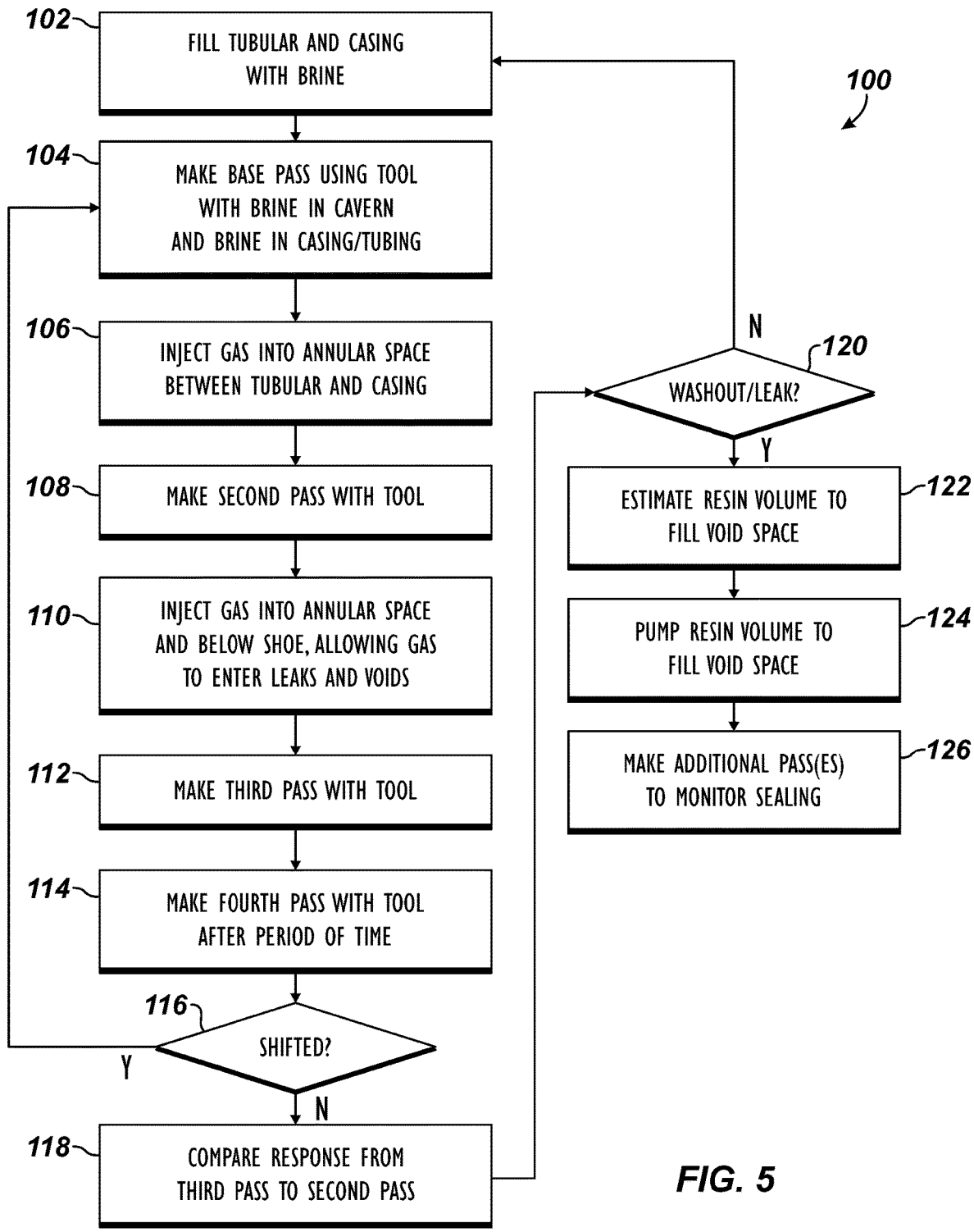
FIG. 5 illustrates a process for detecting a void or a washout behind casing with a logging tool deployed in tubing disposed in casing.

Given the modelled analysis of FIGS. 3 and 4, FIG. 5 illustrates a process 100 for logging the borehole 12 and detecting a void or washout 15 behind casing 20 with the logging tool 50 deployed in the tubing 30. (For purposes of discussion, reference will be made concurrently to the well arrangement depicted in FIG. 1.)

According to the process 100, the salt cavern 10, the casing 20, and the tubing 30 are filled with brine, such as when conducting a mechanical integrity test as noted above (Block 102). For example, the pump 40 of the surface equipment pumps brine from the surface pool 42 down the tubing 30. Any residual hydrocarbon can be displaced and removed from the wellhead 28 for storage or transport.

1. Initial Logging Pass With Brine in Tubing and Annulus

The pulsed neutron logging tool 50 is then run using wireline or other conveyance 55 in a first base pass down the tubing 30 (Block 104). Readings from this first base pass are telemetered to the surface processing equipment 60, which uses the information to generate a base image response (i.e., base logs). The base logs of the base image response can include: a gamma ray log; a wireline tension log; a casing collar log; burst counts for long, far, near and proximal detectors; capture counts for long, far, near and proximal detectors; burst ratios; capture ratios; thermal capture sigma ($\Sigma$) values; and the like as a function of depth in the borehole 12. Some of the logged information may not be used for the purposes disclosed herein, but may be helpful in other analysis.

2. Second Logging Pass with Brine in Tubing and Gas in Annulus Above Shoe

After this first base pass, gas (e.g., gaseous nitrogen $N_2$) is then injected from a source 44 into the annulus 22 between the tubing 30 and the casing 20 (Block 106). The gas is injected until the interface with the brine is just above the casing shoe 26 of the casing 20. In this way, the injected gas cannot leak behind the casing 20 and remains in the annulus 22 between the casing 20 and the tubing 30.

This step may further account for portion of a mechanical integrity test. For instance, the pressure from the injected nitrogen is held for a predetermined amount of time, which can be governed by a given formula for a minimum detectable leak rate. In this way, a certain loss of pressure over the predetermined amount of time can indicate based on calculation that a leak rate exceeds a defined limit, which can be used to access the mechanical integrity of the casing 20.

Operators make a second base pass operating the pulse neutron logging tool 50 in the tubing 30 to obtain measurements (Block 108). For this pass, the annular space 22 between the tubing 30 and the casing 20 is filled with the gas, while the tubing 30 remains filled with brine. Readings from this second base pass are telemetered to the surface processing equipment 60, which uses the information to generate a second base image response (i.e., base logs). Again, the base logs of the second base image response can include: a gamma ray log; a wireline tension log; a casing collar log; burst counts for long, far, near and proximal detectors; capture counts for long, far, near and proximal detectors; burst ratios; capture ratios; thermal capture sigma ($\Sigma$) values; and the like as a function of depth in the tubing 30, the casing 20, and the borehole 12.

Figure 6A:
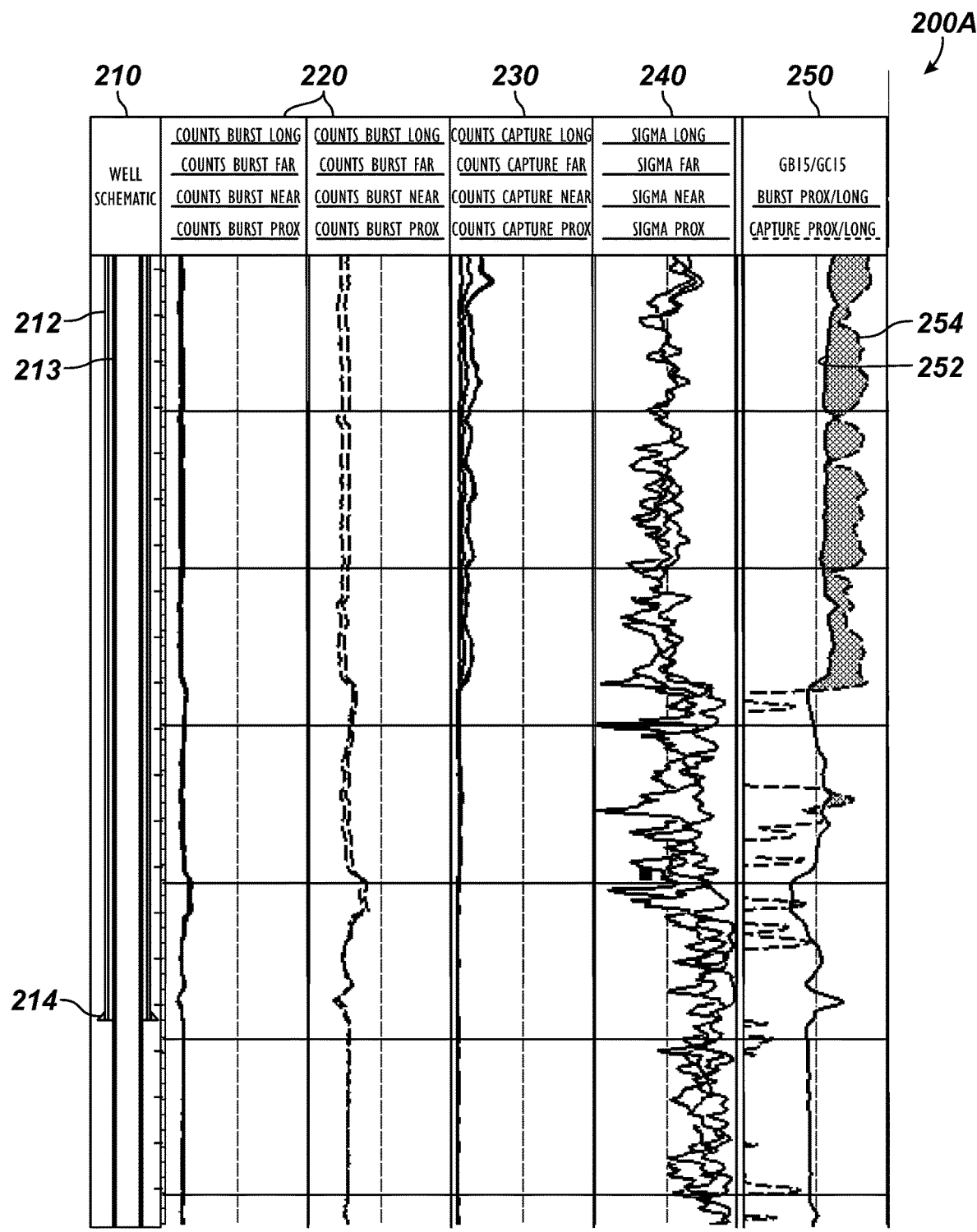
FIG. 6A illustrates an image response of the logging tool in a base pass of the detection process in which the tubing is filled with brine and in which gas is disposed in the annulus between the tubing and casing.

Base Image Response (FIG. 6A)

For example, FIG. 6A illustrates a base image response 200A of logs for the logging tool 50 in this second base pass of the detection process (100) where the tubing 30 is filled with brine and where the gas is disposed in the annulus 22 between the tubing 30 and casing 20. For reference, the well schematic 210 is shown in the image response 200A as a function of depth and depicts the casing 212 with the tubing 213 extending beyond the casing shoe 214.

Exemplary log data is plotted in the form of various graphical logs 220, 230, 240, and 250 in the base image response 200A. The logs show log signals as a function of depth generated in logging the exemplary borehole 12 illustrated schematically in FIG. 1.

Burst logs 220 for burst counts of the long, far, near and proximal detectors (54) are shown at two resolutions. A capture log 230 for capture counts of the long, far, near and proximal detectors (54), and a sigma log 240 for thermal capture sigma ($\Sigma$) values are included. Finally, comparative logs 250 include a plot 252 of the burst ratio (GB15) between the proximal/long detectors (54) and include another plot 254 the capture ratio (GC15) between the proximal/long detectors (54).

3. Third Logging Pass with Brine in Tubing and Gas in Annulus Below Shoe

Returning to the process 100 of FIG. 5, once the second pass is completed, more gas is then injected from the source 44 into the annulus 22 between the casing 20 and the tubing 30 until the interface with the brine is below the casing shoe 26 of the casing 20 (Block 110). Because the gas is now injected into the salt cavern 10 where the borehole 12 extends beyond the casing 20, the gas can enter any leaks or washouts 15 in the salt formation behind the casing 20. If a washout 15 does exist, the gas will fill the washout 15 between the cement 14 and the casing 20. Otherwise, the gas will not leak behind the casing 20 if there is not a washout 15.

This step of injecting gas below the casing shoe 26 may also account for portion of the mechanical integrity test. For instance, the pressure from the injected gas can be held for a predetermined amount of time, which can be governed by a given formula for a minimum detectable leak rate. In this way, a certain loss of pressure over the predetermined amount of time can indicate based on calculation that a leak rate exceeds a defined limit, which can be used to access the mechanical integrity of the salt cavern 10.

With the gas injected below the casing shoe 26, operators make a third pass with the logging tool 50 operating the pulse neutron logging tool 50 in the tubing 30 to obtain measurements (Block 112). Readings from this third pass are telemetered to the surface processing equipment 60, which uses the information to generate an image response (i.e., logs) similar to those noted previously.

Figure 6B:
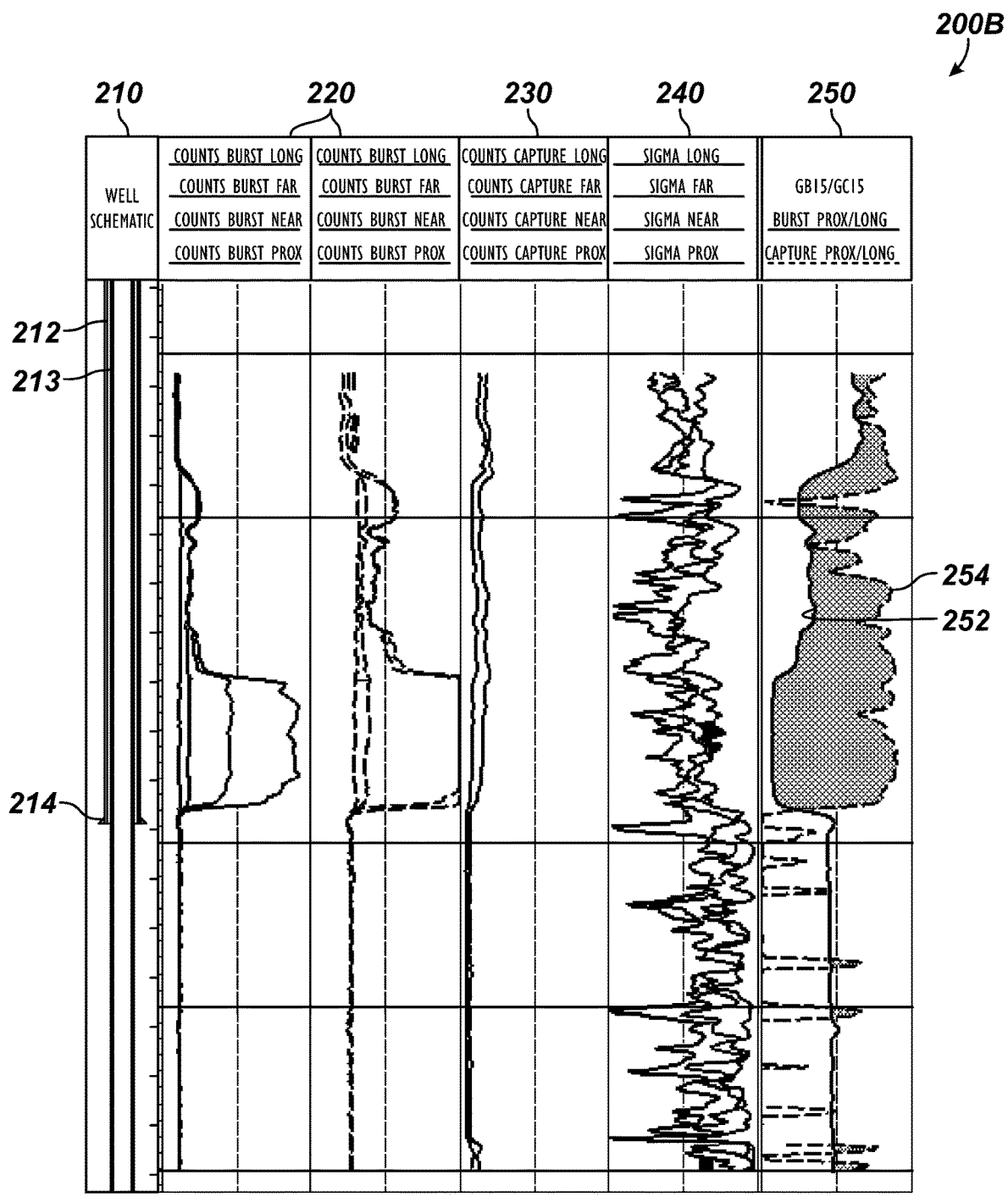
FIG. 6B illustrates an image response of the logging tool in a subsequent pass of the detection process in which the tubing is filled with brine, gas is disposed in the annulus, and gas has potentially seeped behind the casing.

Image Response (FIG. 6B)

For example, FIG. 6B illustrates an image response 200B of the logging tool 50 in the third pass of the detection process (100) in which the tubing 30 is filled with brine, the gas is disposed in the annulus 22, and the gas has potentially seeped into the washout 15 behind the casing 20.

The well schematic 210 is again shown as a function of depth and depicts the casing 212 with the tubing 213 extending beyond the casing shoe 214. The burst logs 220 for burst counts of the long, far, near and proximal detectors are shown at two resolutions. The capture log 230 for capture counts of the long, far, near and proximal detectors and the sigma log 240 for thermal capture sigma ($\Sigma$) values are included. Finally, the comparative logs 250 include the plot 252 of the burst ratio (GB15) between the proximal/long detectors and include the other plot 254 the capture ratio (GC15) between the proximal/long detectors.

4. Fourth Logging Pass with Brine in Tubing and Gas in Annulus Below Shoe

Returning to the detection process of FIG. 5, operators can run the logging tool 50 after a predetermined time in a fourth pass to check that the interface between the brine and the gas has not moved (Block 112), and a determination is made whether the interface has shifted (Decision 114). The interface between the brine and the gas in the borehole 12 can be determined using known techniques.

In addition to measuring the interface, the fourth pass can obtain an image response comparable to the other passes. In this way, a comparison between the fourth pass and the previous third pass can verify the resulting image responses (i.e., that the readings of the image responses are consistent, that further leaking in voids is not occurring, etc.).

Shifting of the interface or discrepancy in the image responses may indicate that gas continues to leak in a void 15 or may indicate that there are errors in the measurements. Should this be the case, some previous steps may need to be repeated. If shifting or discrepancy is not detected, analysis can continue based on the image responses obtained. In general, the step of checking that the interface has not moved is part of a mechanical integrity test (MIT). The "caliper" of a washout as discussed below can be determined from the steps for the first, second and third passes.

Using the image responses, for example, operators determine that a leak does exist, detect the void or washout 15, and estimate the volume of the void or washout 15. In particular, the image response from the third or fourth pass (brine in the tubing 30, gas in the annulus 22, and possible gas behind the casing 20) (Block 112 or 114) are compared to the image response from the second pass (brine in the tubing 30 and gas in the annulus 22) (Block 108) to determine if there is a washout 15 in the salt formation behind the casing 20 (Block 118). (Should it be necessary, the image response of the second pass (brine in the tubing 30 and gas in the annulus 22) can be compared to the initial image response of the first pass (brine in the tubing 30 and brine in the annulus 22) for calibration purposes.)

5. Detecting and Estimating Washout

From the comparison of the image responses of the third/fourth pass to the second pass, the process 100 determines if a washout 15 is present (Decision 120). If not, additional measurements may be necessary or the process (100) may end successfully. If a washout 15 is present, then the process 100 estimates the volume of the washout 15 so the volume of resin needed to seal the leak in a remedial operation can be estimated (Block 122).

If there is a washout 15, the burst ratios (GB15) from the pulsed neutron responses of the logging tool 50 in the comparison of Block 118 are expected to be lower in the third/fourth pass (Block 112 or 114) compared to the second pass (Block 108). Analysis based on the burst ratios (GB15) may be preferred because they may show the most detectable readings and differences. Analysis could be based alternatively or concurrently on capture ratios (GC15). The capture ratios (GC15) from the pulsed neutron responses of the logging tool 50 in the comparison of Block 118 may also be expected to be lower in the third/fourth pass (Block 112 or 114) compared to the second pass (Block 108).

To make the determination of the washout 15 from the burst/capture ratios (GB15, GC15) of the image response, the processing unit 60 runs the MCNP (Monte Carlo N-Particle) analysis as discussed previously for different potential washout diameters in order to characterize the expected responses of the logging tool 50 for the burst/capture ratios. Regression is performed on these characterizations and applied to the actual tool measurements in the image responses to create a caliper-behind-casing estimation of the washout 15.

Figure 6C:
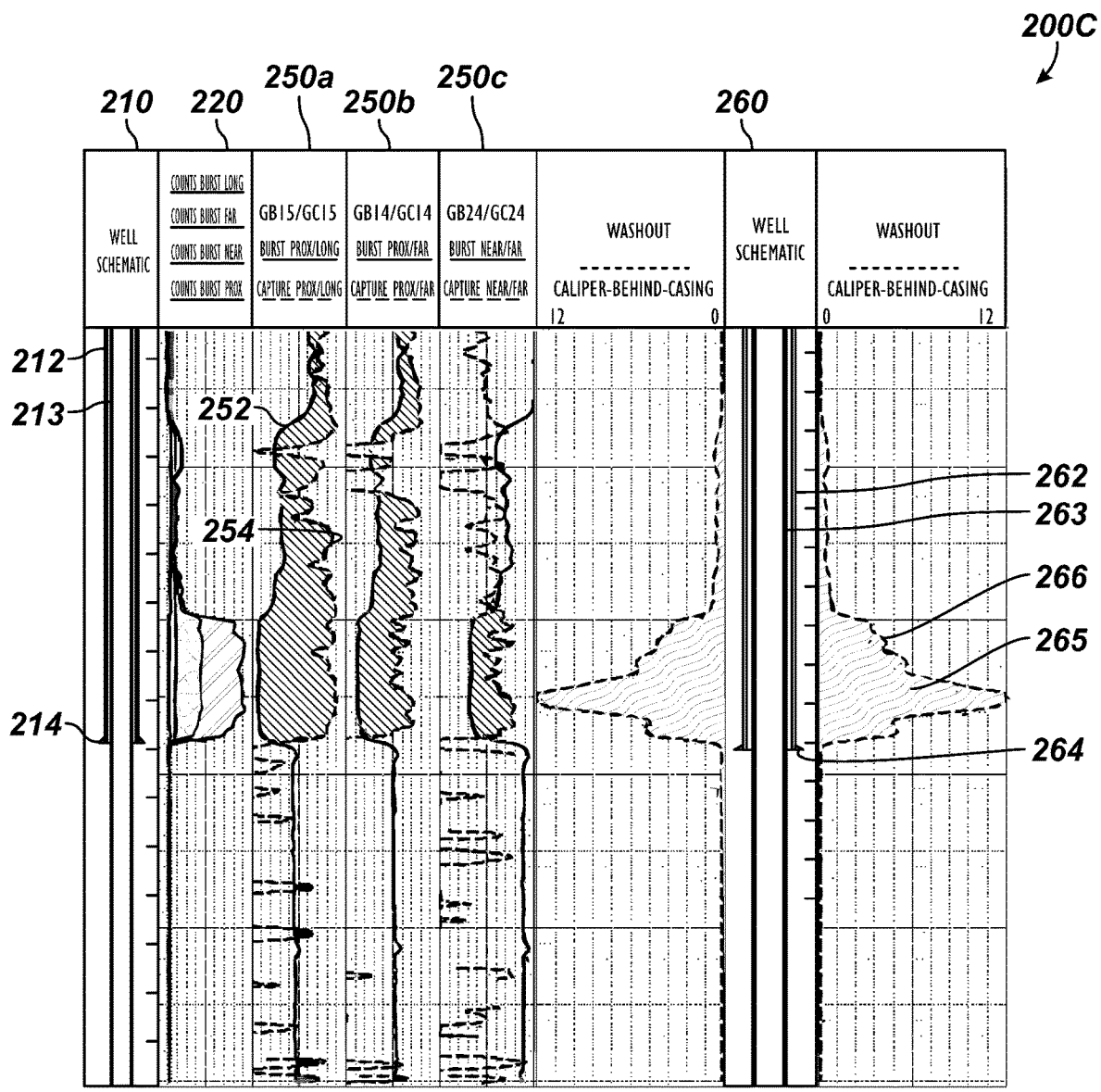
FIG. 6C illustrates an image response of the logging tool after processing to determine radius of a washout behind the casing.

Image Response (FIG. 6C)

For example, FIG. 6C illustrates an image response 200C of the logging tool 50 after processing to determine a radius of a washout 15 behind the casing 20. The well schematic 210 is again shown as a function of depth and depicts the casing 212 with the tubing 213 extending beyond the casing shoe 214. The burst log 220 for burst counts of the long, far, near and proximal detectors from the third/fourth pass are shown at one resolution. The comparative logs 250a from the third/fourth pass are shown and include the plot 252 of the burst ratio (GB15) between the proximal/long detectors and the other plot 254 the capture ratio (GC15) between the proximal/long detectors.

Other comparative logs 250b-c from the third/fourth pass are also shown. These include the logs 250b having the plot of the burst ratio (GB14) and capture ratio (GC14) between the proximal/far detectors and the logs 250c having the plot of the burst ratio (GB24) and capture ratio (GC24) between the near/far detectors.

Finally, another well schematic 260 depicts the casing 262 with the tubing 263 extending beyond the casing shoe 264 as a function of depth. The region labelled 265 illustrates a washout (i.e., caliper enlargement) created after the installation of the casing 20. The estimated radius 266 of the salt formation outside the casing 20 as predicted by the analysis disclosed herein is plotted as a function of depth relative to the casing 262. As can be seen in this plot, the estimated radius 266 indicates that a r washout 265 exists in the borehole behind the casing 262 uphole of the casing shoe 264. The volume of this washout 265 can be estimated so a volume of resin needed to seal the washout 265 can be calculated.

As would be expected, any pre-casing openhole log in this region would not have suggested that any abnormal borehole diameter value would subsequently develop. Any pre-casing logs would likely have recorded low count rates in the region 265, but these pre-casing logs are poor indicators of what would result following the break-up of the formation in the region 265 as a result of post-casing washout.

On the other hand, the comparative logs 252, 254 that are plotted following post-casing and cementing indicate a dramatic increase in the borehole diameter behind the casing 20. From such readings, it is possible to estimate the addition to the volume of the borehole 12 caused by the caliper enlargement. From this estimated volume, it is also possible to estimate the cost of remedial work, of the kind outlined above, on the borehole 12.

As shown in the process 100 of FIG. 5, operators pump resin to seal the leak and fill the washout 15 behind the casing 20. Pumping of the resin can involve using a bradenhead squeeze to force the resin into the leaks in the formation outside the casing 20 where the resin is then allowed to harden. Various types of known resin can be used that can harden in the aqueous brine.

After the resin is pumped and hardened, operators can make a number of additional passes with the logging tool 50 to determine how the resin has sealed the leak and filled the washout 15. For example, comparison of burst data can be performed over intervals of time in a number of passes to determine how the resin has filled the washout 15. The burst ratio (GB15) is expected to indicate the higher density across the pumped resin filling the washout 15. In the end, the caliper analysis may indicate that only a minor void remains after the resin has been pumped so the salt cavern 10 can be returned to storage operations.

D. Alternative Processes of Detecting/Estimating Washout Behind Casing

In the process 100 of FIG. 5, four passes of the logging tool 50 have been described. However, fewer passes can be used to detect the leak or washout 15. For example, more or fewer passes may be needed to make baseline measurements. Also, a pass to check for shifting of the interface may not be necessary or may be performed more than once. In general, the image response from the third pass (brine in the tubing 30, gas in annulus 22, possible gas behind the casing 20) is at least compared to the image response from the second pass (brine in the tubing 30, gas in the annulus 22) to detect the washout 15 and estimate its volume.

The caliper of the washout 15 behind the casing 20 can be estimated with fewer passes than necessarily disclosed above. For instance, the fourth pass to check that the interface has not moved may not be necessarily performed and may not be used in the estimation. In general, either the base pass of Block 104 or the second pass of Block 108 need not be performed in order to estimate the caliper.

For example, there may be implementations where the base pass of Block 104 or the second pass of Block 108 cannot be performed. In these cases, a water filled base pass can be simulated by considering other log data, such as Capture and Burst counts/ratios, GR and other available Open Hole log data. A simulated baseline can be established from these log responses by normalizing uphole and downhole of the suspected washout in the borehole. With this simulation of the simulated baseline, it is now possible to estimate the washout 15 using the same methodologies disclosed in detail previously, albeit there may be higher error and less accuracy with this method.

As can be seen, the disclosed process for estimating the washout behind casing uses a comparative procedure between passes of a pulse neutron logging tool, where the casing annulus is filled with brine, filled with gas above the casing shoe, and filled with gas below the casing shoe. As will be appreciated, this comparative procedure can use passes of a pulse neutron logging tool when the casing annulus is filled with brine and gas in other ways.

Figure 7:
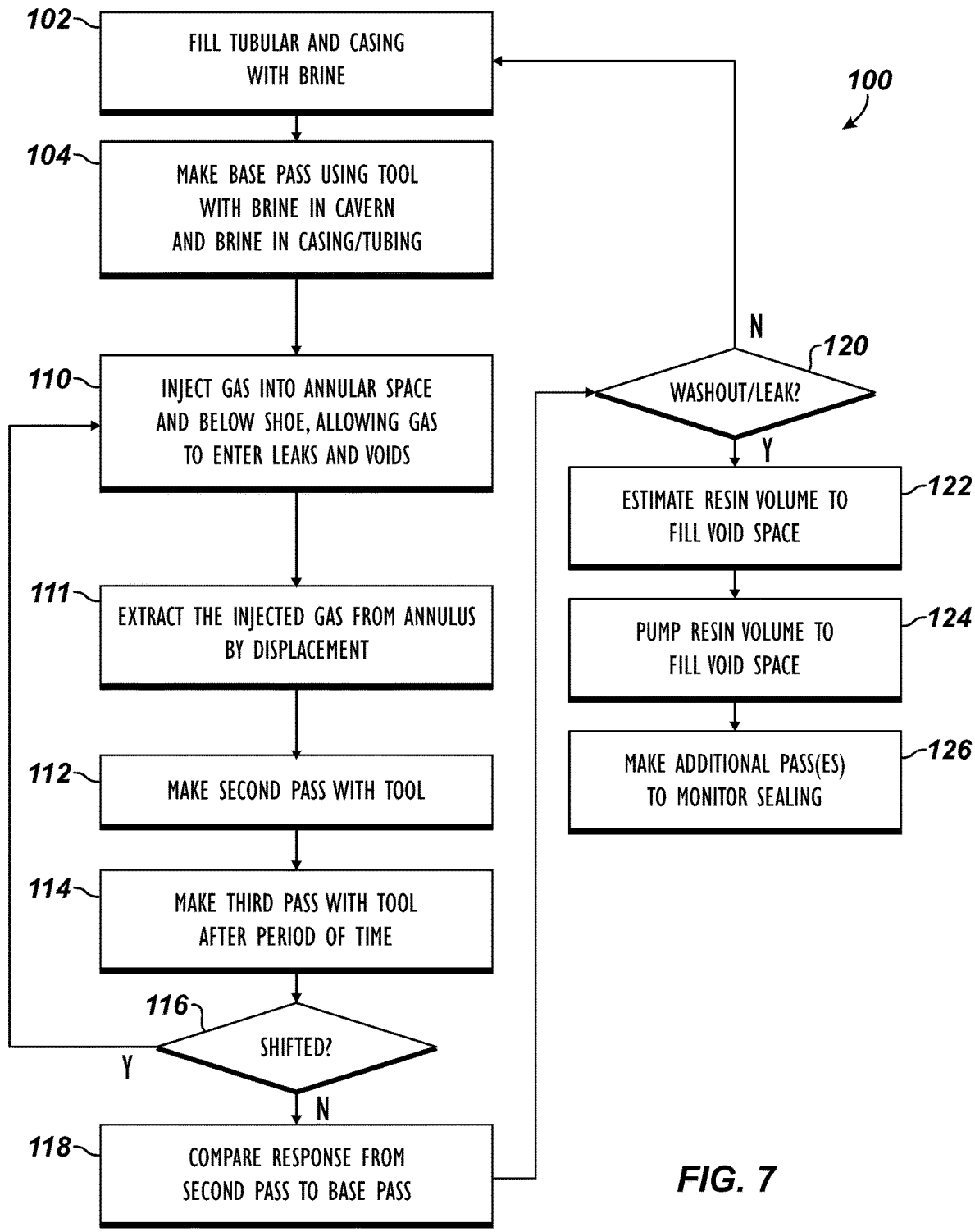
FIG. 7 illustrates another process for detecting a void or a washout behind casing with a logging tool deployed in tubing disposed in casing.

FIG. 7 illustrates another process 100 for logging the borehole 12 and detecting a void or washout 15 behind casing 20 with the logging tool 50 deployed in the tubing 30. (For purposes of discussion, reference will be made concurrently to the well arrangement depicted in FIG. 1.)

The tubing 30 and an annulus 22 between the tubing 30 and the casing 20 are filled with a liquid, such as brine (Block 102), and a first image response is obtained of a portion of the borehole with the annulus 22 filled with the liquid by operating a logging tool 50 in the tubing 30 along the borehole (Block 104).

A gas, such as gaseous nitrogen, is then injected into the annulus 22 between the tubing 30 and the casing 22 to a point below the casing shoe 26 of the casing 20 in the borehole (Block 110). As noted herein, the gas can then enter any leak or washout 15 behind the casing 20. Eventually, the injected gas can be removed (extracted) from the annulus 22 by displacing the gas in the annulus 22 with the liquid supplied through the tubing 30 or by some other procedure (Block 111).

To inject the gas (Block 110), the gas can be injected down the annulus 22 to a point below the casing shoe 26. Once the gas is allowed to enter any potential washout 15, the gas remaining in the annulus 22 can be removed or extracted. For example, the gas in the annulus 22 can be displaced with the liquid supplied through the tubing 30 so the gas can be removed at the wellhead 28 (Block 111).

As an alternative to inject the gas (Block 110), the gas can be injected using a capillary string run down the annulus 22 to a point below the casing shoe 26. Sealing or packing in the annulus 22 can then concentrate the gas to enter any potential washout 15. Once the gas is allowed to enter the potential washout 15, the capillary string can be removed, and any residual gas remaining in the annulus 22 can be removed at the wellhead 28 (Block 111).

In the end, the gas that has leaked into the washout 15 in any of these procedures can remain so that comparative logging responses can be obtained between the washout 15 first filled with brine and then filled with gas while the annulus 22 is filled with brine. At this point, a second image response is obtained of the portion of the borehole with the annulus 22 filled with the displacement fluid by operating the logging tool 50 in the tubing 30 along the borehole (Block 112). The washout 15 would potentially hold injected gas. If desired, an additional pass after a time can be performed (Block 114) to determine if any shifting has occurred (Decision 116) due to a larger leak/washout.

In any event, the process 100 continues with comparing the second image response from the second pass to the first image response of the base pass (Block 118). The void or washout 15 can be detected in the formation behind the casing 20 based on the comparison due to the injected gas potentially trapped in the washout 15 (Decision 120). If the washout 15 is present (Yes at Decision 120), then estimates can be made of the resin required to fill the voided space (Blocks 122, 124, 126).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of logging a borehole in a formation, the borehole having casing installed therein to a casing shoe, the borehole having tubing installed in the casing and extending beyond the casing shoe, the method comprising:
    filling the tubing and an annulus between the tubing and the casing with a liquid;
    injecting a gas into the annulus between the tubing and the casing to a first point above the casing shoe of the casing in the borehole;
    obtaining a first image response of a portion of the borehole with the annulus filled with the injected gas above the casing shoe by operating a logging tool in the tubing along the borehole to image the borehole in the formation behind the casing;
    injecting the gas into the annulus between the tubing and the casing to a second point below the casing shoe of the casing in the borehole;
    obtaining a second image response of the portion of the borehole with the annulus filled with the injected gas below the casing shoe by operating the logging tool in the borehole to image the borehole in the formation behind the casing;
    comparing the second image response to the first image response; and detecting a void between the casing and the borehole in the formation behind the casing based on the comparison.

2. The method of claim 1, wherein filling with the liquid comprises filing with brine as the liquid; and wherein injecting the gas comprise injecting gaseous nitrogen as the gas.

3. The method of claim 1, comprising obtaining, before the first image response, an initial image response of the portion of the borehole with the tubing and the annulus filled with the liquid by operating the logging tool in the tubing along the borehole to image the borehole in the formation behind the casing.

4. The method of claim 3, further comprising calibrating the first image response based on the initial image response.

5. The method of claim 1, further comprising estimating a volume of the detected void between the casing and the borehole in the formation behind the casing.

6. The method of claim 5, further comprising estimating an amount of resin to fill the estimated volume of the detected void.

7. The method of claim 6, further comprising pumping the estimated amount of resin to fill the detected void.

8. The method of claim 1, wherein obtaining the second image response of the portion of the borehole with the annulus filled with the injected gas below the casing shoe by operating the logging tool in the tubing along the borehole to image the borehole in the formation behind the casing comprises:
making a first pass of the portion of the borehole with the logging tool;
making at least one second pass of the portion of the borehole with the logging tool after a period of time; and
comparing the second image response of the first pass to that of the at least one second pass.

9. The method of claim 8, further comprising determining, from the comparison, that an interface between the liquid and the injected gas has not shifted.

10. The method of claim 8, further comprising verifying, from the comparison, the second image response.

11. The method of claim 1, wherein obtaining the first and second image responses by operating the logging tool in the tubing along the borehole to image the borehole in the formation behind the casing comprises operating a pulse neutron logging tool as the logging tool.

12. The method of claim 11, wherein operating the pulse neutron logging tool comprises:
counting first bursts as a function of depth at a first detector of the pulsed neutron logging tool being a first distance the neutron source; counting second bursts as a function of depth at a second detector of the pulsed neutron logging tool being a second distance from the neutron source, the second distance greater than the first distance; and
calculating a burst ratio of the first burst count relative to the second burst count as a function of depth.

13. The method of claim 12, wherein comparing the second image response to the first image response comprises subtracting the calculated burst ratio of the first image response as a function of depth from the calculated burst ratio of the second image response as a function of depth; and extrapolating caliper of the borehole as a function of depth from the difference based at least on a porosity of the formation in which the borehole is disposed.

14. The method of claim 1, wherein injecting the gas into the annulus between the tubing and the casing to the first point above the casing shoe of the casing in the borehole comprises monitoring pressure of the injected gas for a predetermined amount of time; and calculating a leak rate of the injected gas as a function of the monitored pressure relative to the predetermined amount of time.

15. The method of claim 1, wherein injecting the gas into the annulus between the tubing and the casing to the second point below the casing shoe of the casing in the borehole comprises monitoring pressure of the injected gas for a predetermined amount of time; and calculating a leak rate of the injected gas as a function of the monitored pressure relative to the predetermined amount of time.

16. The method of claim 1, wherein detecting the void in the formation behind the casing based on the comparison comprises basing the detection on a porosity of the formation.

17. A method of logging a borehole in a formation, the borehole having casing installed therein to a casing shoe, the borehole having tubing installed in the casing and extending beyond the casing shoe, the method comprising:
filling the tubing and an annulus between the tubing and the casing with a liquid;
obtaining a first image response of a portion of the borehole with the annulus filled with the liquid by operating a logging tool in the tubing along the borehole;
injecting a gas into the annulus between the tubing and the casing to a point below the casing shoe of the casing in the borehole by injecting the gas directly at an open hole portion of the borehole below the casing shoe, thereby allowing the gas to enter a potential void in the borehole behind the casing;
removing any of the injected gas from the annulus while the gas is allowed to remain in the potential void;
obtaining a second image response of the portion of the borehole while the annulus is filled with the fluid and the potential void is filled with the gas by operating the logging tool in the tubing along the borehole;
comparing the second image response to the first image response; and
detecting the potential void in the formation behind the casing based on the comparison.

18. The method of claim 14, wherein calculating the leak rate comprises predicting a washout in the formation behind the casing based on the calculated leak rate; and wherein detecting the void comprises estimating a volume of the washout in the formation behind the casing based on the comparison of the second image response to the first image response.

19. A method of logging a borehole in a formation, the borehole having casing installed therein to a casing shoe, the borehole having tubing installed in the casing and extending beyond the casing shoe, the method comprising:
filling the tubing and an annulus between the tubing and the casing with a liquid;
injecting a gas into the annulus between the tubing and the casing to a first point above the casing shoe of the casing in the borehole;
obtaining a first image response of a portion of the borehole with the annulus filled with the injected gas above the casing shoe by operating a logging tool in the tubing along the borehole;
injecting the gas into the annulus between the tubing and the casing to a second point below the casing shoe of the casing in the borehole;
obtaining a second image response of the portion of the borehole with the annulus filled with the injected gas below the casing shoe by operating the logging tool in the tubing along the borehole;
comparing the second image response to the first image response;
detecting a void in the formation behind the casing based on the comparison;
estimating a volume of the detected void in the formation; and
estimating an amount of resin to fill the estimated volume of the detected void.

20. The method of claim 19, further comprising pumping the estimated amount of resin to fill the detected void.

21. A method of logging a borehole in a formation, the borehole having casing installed therein to a casing shoe, the borehole having tubing installed in the casing and extending beyond the casing shoe, the method comprising:

filling the tubing and an annulus between the tubing and the casing with a liquid;

obtaining a first image response of a portion of the borehole with the annulus filled with the liquid by operating a logging tool in the tubing along the borehole;

injecting a gas into the annulus between the tubing and the casing to a point below the casing shoe of the casing in the borehole, thereby allowing the gas to enter a potential void in the borehole behind the casing;

extracting the injected gas from the annulus by displacing the gas in the annulus with the liquid supplied through the tubing to remove any of the injected gas from the annulus while the gas is allowed to remain in the potential void;

obtaining a second image response of the portion of the borehole while the annulus is filled with the fluid and the potential void is filled with the gas by operating the logging tool in the tubing along the borehole;

comparing the second image response to the first image response; and detecting the potential void in the formation behind the casing based on the comparison.

\* \* \* \* \*